(12) United States Patent
Intwala et al.

(10) Patent No.: US 9,117,253 B2
(45) Date of Patent: Aug. 25, 2015

(54) PERSPECTIVE WARP

(75) Inventors: Chintan Intwala, Glendora, CA (US); Aseem Agarwala, Seattle, WA (US)

(73) Assignee: Adobe Systems Incorporated, San Jose, CA (US)

(*) Notice: Subject to any disclaimer, the term of this patent is extended or adjusted under 35 U.S.C. 154(b) by 332 days.

(21) Appl. No.: 13/554,903

(22) Filed: Jul. 20, 2012

(65) Prior Publication Data

US 2014/0022276 A1    Jan. 23, 2014

(51) Int. Cl.
*G09G 5/00* (2006.01)
*G06T 3/00* (2006.01)

(52) U.S. Cl.
CPC ........................................ *G06T 3/00* (2013.01)

(58) Field of Classification Search
CPC ........ G09G 5/00; G06T 11/60; G06T 3/4038; G06T 15/205; G06F 3/04842
USPC .......................................................... 345/619
See application file for complete search history.

(56) References Cited

PUBLICATIONS

Lonestar Digital.com; Perspective Distortion Correction Tutorial (captured on Jan. 25, 2008); http://www.lonestardigital.com/perspective_correction.htm.*
Terry Duell, Bruno Postle; Hugin tutorial—Perspective correction (Jun. 2008); http://hugin.sourceforge.net/tutorials/perspective/en.shtml.*
Takeo Igarashi, Tomer Moscovich, John F. Hughes; As rigid-as-possible shape manipulation; ACM transactions on Graphics (TOG), vol. 24, issue 3 (Jul. 2005).*

* cited by examiner

*Primary Examiner* — Peter Hoang
(74) *Attorney, Agent, or Firm* — Kilpatrick Townsend & Stockton LLP

(57) ABSTRACT

Systems and methods are provided that allow a user to specify one or more areas of, e.g., a digital image, upon which perspective manipulation is to be applied. Once the one or more areas of the digital image have been specified, the user may specify one or more portions within the one or more areas, such as points, lines, etc., as being constrained in some manner. Thereafter, the user is able to manipulate perspective within the one or more specified areas in an intuitive and efficient manner.

23 Claims, 11 Drawing Sheets

PERSPECTIVE WARP

TECHNICAL FIELD

The present invention relates to computer-implemented methods and systems of image processing, and in particular, to easily and efficiently manipulating perspective in a captured image.

BACKGROUND

Perspective is a term used to refer to the way in which objects, visual scenes, etc. appear to the human eye based on spatial attributes and/or the dimensions of such objects, visual scenes, etc., as well as the position of the human eye relative to those objects, visual scenes, etc. Since the Renaissance period, artists have used perspective as a way to depict three dimensional (3D) scenes onto a two dimensional (2D) surface. In the context of, e.g., photographic imaging, perspective may be adjusted or controlled depending on the positioning of the camera lens when a photograph is taken and/or by adjusting or controlling depth of field.

Oftentimes, unless a photographer is "perfectly" positioned, the perspective of a photograph taken by the photographer, especially one which includes buildings or other objects with straight lines and/or orthogonal aspects, is skewed. As an example, depending on where or how a photograph of, e.g., a building, is taken, one or more edges of the building that should be vertical may appear to be tilted or otherwise, non-vertical. Hence, post-processing tools or software, such as image editors, are used to manipulate the perspective in an image. However, conventional post-processing tools provide limited manipulation at best, such as, e.g., allowing manipulation only from the four corners of an entire image, and even those tools that do provide a mechanism for warping/controlling perspective often involve multiple tedious steps. That is, a user must actually work backwards to achieve a desired perspective, and must do so in the dark, i.e., without any preview of the adjusted perspective. In such instances, and for all intents and purposes, a user is forced to adjust perspective by trial and error without direct input, where, for example, the user specifies an area to be warped, inputs certain constraints or parameters, and then waits for the conventional tool to display the result.

Further to the above, conventional tools do not provide for direct image space controls over vanishing points, construction lines and object shapes that illustrators/artists/users commonly adjust to create perspective images. Moreover, these conventional tools limit photographers to using a single, consistent projection across an entire image. Unlike painters, photographers cannot create images from physically inaccessible viewpoints, or locally combine multiple perspectives for different objects.

SUMMARY

Various aspects of examples of the invention are set out in the claims.

According to a first aspect of the present invention, a method comprises receiving an indication of a portion of digital media to undergo perspective manipulation. The method further comprises providing a user interface through which the perspective manipulation is to be performed, and performing the perspective manipulation of the portion of the digital media in accordance with user input. Further still, the method comprises displaying a real-time preview of the perspective manipulation.

According to a second aspect of the present invention, an apparatus comprises a processor; and a memory including computer program code, the memory and the computer program code configured to, with the at least one processor, cause the apparatus to perform at least the following: receiving an indication of a portion of digital media to undergo perspective manipulation; providing a user interface through which the perspective manipulation is to be performed; performing the perspective manipulation of the portion of the digital media in accordance with user input; and displaying a real-time preview of the perspective manipulation.

According to a third aspect of the present invention, a computer program product is embodied on a computer-readable non-transitory medium and comprises computer code for receiving first information regarding at least one user-defined quadrilateral section of a digital image to undergo perspective manipulation; computer code for translating direct user interaction with the at least one user-defined quadrilateral section into the perspective manipulation via a user interface; and computer code for displaying a real-time preview of the perspective manipulation.

According to a fourth aspect of the present invention, a system comprises an input mechanism through which first information regarding at least one user-defined quadrilateral section of a digital image to undergo perspective manipulation is received. The system further comprises a processor operatively connected to the input mechanism and configured to translate direct user interaction with the at least one user-defined quadrilateral section into the perspective manipulation via a user interface controlled through the input mechanism. Additionally, the system comprises a display device configured to present a real-time preview of the perspective manipulation.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

Figure 1:
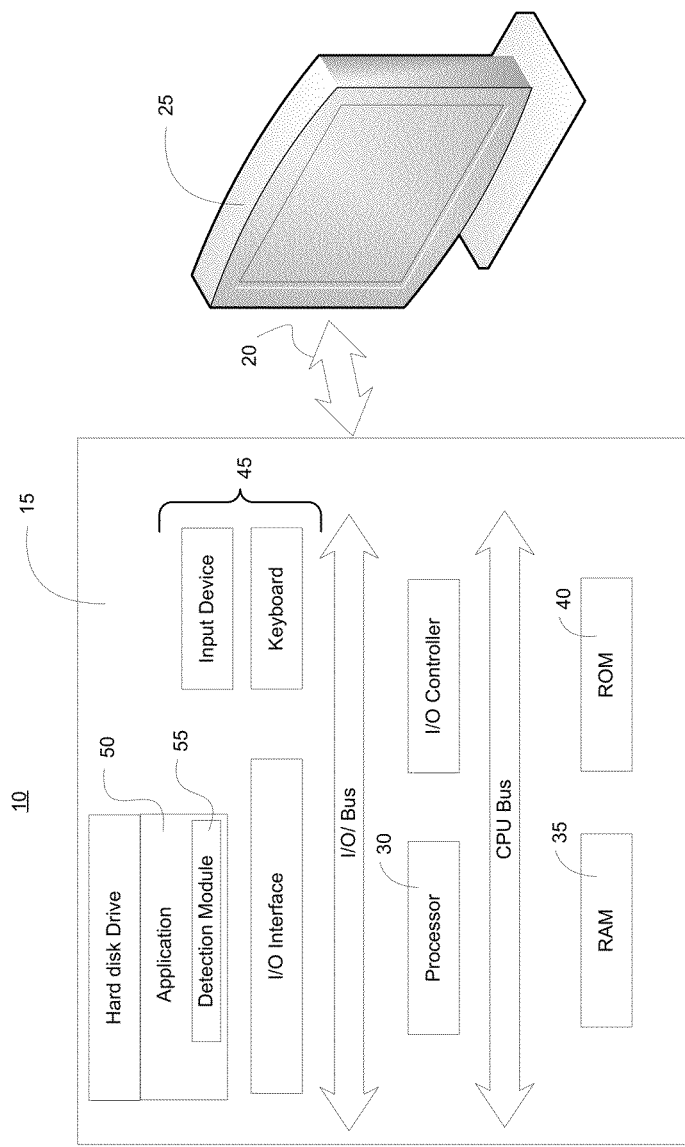
FIG. 1 is an exemplary representation of a computer system in which various embodiments may be implemented.

Systems and methods are provided that allow a user to manipulate perspective in digital media, such as a digital/digitized image, video, etc. That is, perspective manipulation as disclosed herein refers to adjusting, warping, or otherwise controlling the perspective of one or more aspects or portions within digital media. Additionally, and while a user is manipulating perspective in an image, the user is provided with a real-time preview of the manipulation so that the user is aware of how the digital media is being altered by his/her action(s). As a result, the user is provided with an interactive editing process, which fosters transparency, confidence, ease of use, and creativity.

At a high-level, manipulation of perspective involves two phases, i.e., a markup phase, and a perspective manipulation phase. The markup phase involves the user indicating what quadrilateral (or quad) will undergo perspective manipulation. A quadrilateral may be thought of as the basis or starting point for perspective manipulation. That is, a quadrilateral refers to the minimum amount of information, i.e., an area defined by any four points, needed in order for the user to begin manipulating perspective, where the quad is a portion of digital media, such as an image, that is less than the entire image. A common example of a quad in an image may be a façade, wall, or particular side of a building.

It should be noted that more than one quad may be defined or chosen by the user to undergo perspective manipulation. That is, various embodiments support the perspective manipulation of multiple quads to handle cases of N-point-perspectives (where N stands for the number of vanishing points in the image). A vanishing point refers to one of possible points in a 2D image where lines that are parallel in the 3D source converge. Once the quad(s) is specified, the user may also engage in the repositioning of the quad(s) vertices which yields the desired deformation. It should be further noted that defined/chosen quads may share edges or have edges that overlap each other.

Moreover, and further with respect to selecting/defining quads to undergo perspective manipulation, existing aspects of an image may be leveraged. For example, images oftentimes already contain edges, lines, faces, corners, etc. Such aspects of an image may be easily and automatically detected by, e.g., a detection module, and assistance may be provided to a user in drawing, defining, or otherwise selecting a quad. That is, once the user has begun drawing a quad, movement of the input mechanism, e.g., a mouse, may be constrained such that it follows an edge that the cursor is closest to. Further still, assistance may be provided by helping to snap the cursor to, e.g., a corner of a room in an image.

Additional information may be provided by the user regarding parameters and/or constraints (also referred to as hints) that will affect how the perspective of the quad is manipulated. For example, and as will be discussed subsequently in greater detail, the user may specify that a particular line (e.g., an edge in the structure of a building) is to be left unaltered while the remainder of the quad undergoes perspective manipulation, or that manipulation is to occur about a point within a quad, while the point remains stationary.

Once the quad(s) and any hints have been specified, the user is free to perform perspective manipulation, i.e., deform or manipulate the specified quads to whatever form or in whatever manner is desired in the perspective manipulation phase. For example, the user may manipulate the perspective associated with a side of a building in an image so that the image appears as if it was taken directly facing the side of the building, or to make the image appear to have a greater depth of field in a particular direction, etc. While deforming one or more quads, the image undergoes a global smooth deformation (or warp) to reflect the user interaction, i.e., the perspective manipulation. As previously alluded to, this user interaction is accompanied by live and real-time feedback. That is, the user is provided with an immediate preview of the manipulated image so that the user is able to perceive how he/she is altering perspective as it occurs.

It should be noted that a user need not complete marking up an image prior to manipulating perspective. That is, the user may pick and choose one or more quads, specify one or more hints, and manipulate perspective(s) as he/she desires. For example, the user may specify a quad, mark up the quad, and perform perspective manipulation. Thereafter, the user may provide further hints in the quad, and again, perform perspective manipulation. Again, the only prerequisite to performing perspective manipulation is that at least one quad has been selected as the area to undergo manipulation. Even after the user has marked up the image, provided hints, and performed some perspective manipulation, the user still has the ability, in accordance with various embodiments, to go back and change any applied markups, add new quads or hints, etc.

In accordance with one embodiment, an algorithm is used to drive the perspective manipulation, where the algorithm is not necessarily automatic. That is, and as indicated previously, the user selects one or more quads, and provides hints regarding which areas are to be manipulated or which are not, etc. However, in accordance with other embodiments or in addition to the aforementioned embodiment, the algorithm may be configured to provide certain automatic manipulations, such as a "snap-to" feature. Such a snap-to feature may automatically snap a specified line or quad to some default perspective setting, such as default vertical or horizontal planes or other defined plane(s).

Utilization of the algorithm, as seen from the user's point of view, is performed through a tool, such as an image editing tool or software feature within a broader application, such as Adobe® Photoshop® that is implemented on a computer or processor-controlled device. FIG. 1 is an exemplary representation of a computer system 10 in which various embodiments may be implemented. The computer system 10 includes one or more computers 15, a communications bus 20, and a display device 25. Computer 15 can be a personal computer, workstation, or other processor-controlled device, and it may be local to the user performing the editing or remote from the user. For example, the computer system 10 may include a server computer communicating with a client computer. Computer 15 may include one or more processors 30, a memory bus, random access memory (RAM) 35, read only memory (ROM) 40, peripherals 45. The peripherals 45 may include a keyboard, or other input devices, e.g., a pointing device, mouse, etc., that may be utilized to effectuate selection and/or manipulation actions of the user. Still other peripherals 45 may include storage devices, e.g., floppy disk drive, hard disk drive, flash memory unit, etc. (not shown). The storage devices typically include an operating system and one or more applications including the tool/application 50 described herein, the tool including one or more modules, such as the aforementioned detection module 55.

The tool provides a user interface that allows the user to specify one or more quads and hints, and effectuate perspective manipulation. That is, the user may select one or more quads as previously described through various input mechanisms, such as, but not limited to, using a mouse, stylus, and/or touch screen capabilities to draw or indicate the points that define a quad. Once the quad(s) is chosen, the user may specify hints, by again, using one or more input mechanisms to indicate points, lines, areas, etc. that are to be somehow, constrained. Thereafter, the user interface provides a mechanism that allows the user to manipulate the perspective of the one or more quads.

Figure 2:
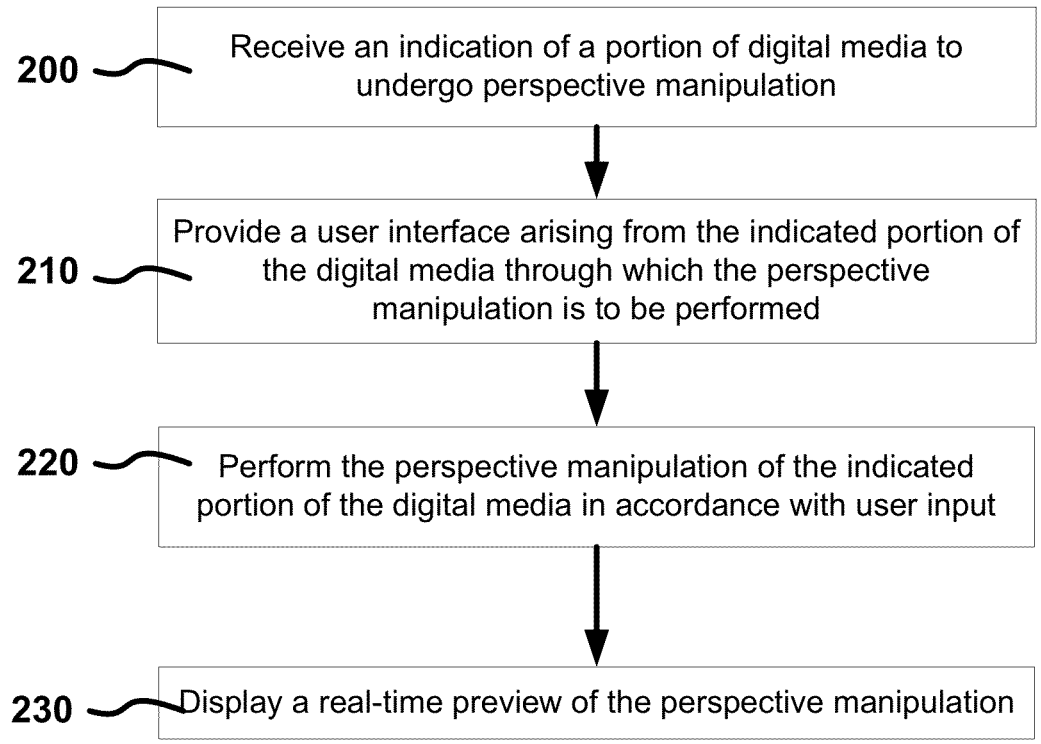
FIG. 2 is a flow chart illustrating a process in accordance with an embodiment of the invention.

FIG. 2 illustrates an exemplary flow chart of processes performed to effectuate perspective manipulation in accordance with various embodiments. At 200, an indication of a portion of digital media to undergo perspective manipulation is received. For example, and as previously described, the portion of the digital media may be a user-defined quadrilateral section or quad delineating an object or aspect of a digital image. At 210, a user interface arising from the indicated portion of the digital media is provided through which the perspective manipulation is to be performed. That is, once a quad is selected by the user, a user interface appears to allow the user to control perspective manipulation on that selected quad, such that the user may interact with the user interface, such as clicking/dragging a point of control with an input mechanism. At 220, the perspective manipulation of the indicated portion of the digital media is performed in accordance with user input. That is, the user input involves direct interaction with the portion of the digital media, where interactive movements/motions by the user and effectuated via the input mechanism and user interface are directly translated into manipulating perspective. At 230, a real-time preview of the perspective manipulation is displayed so that the user is able to see how his/her interaction directly affects the perspective.

Figure 3A:
FIGS. 3A-3C illustrate an exemplary perspective manipulation tool and image markup in accordance with various embodiments.
Figure 3B:
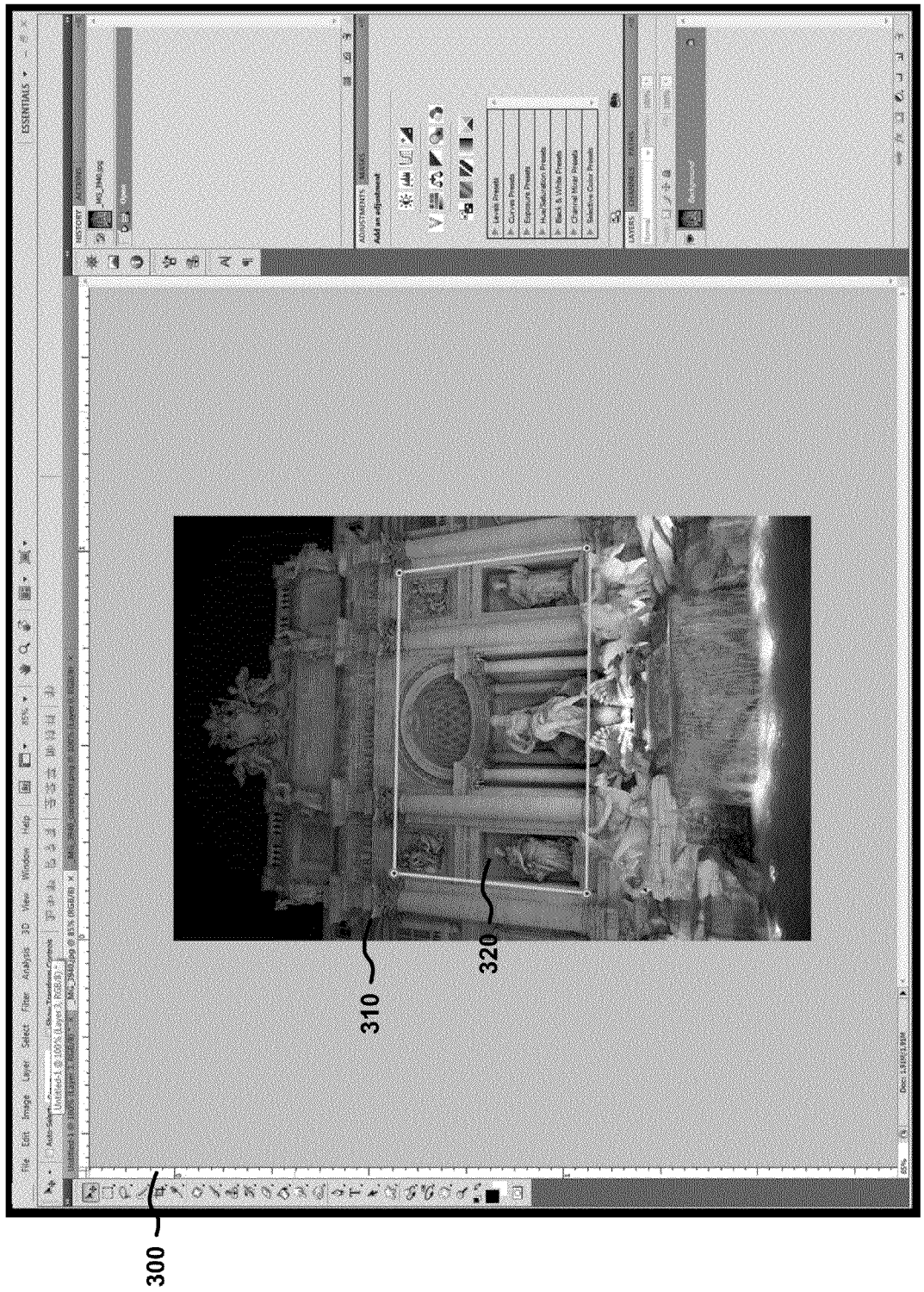
Figure 3C:
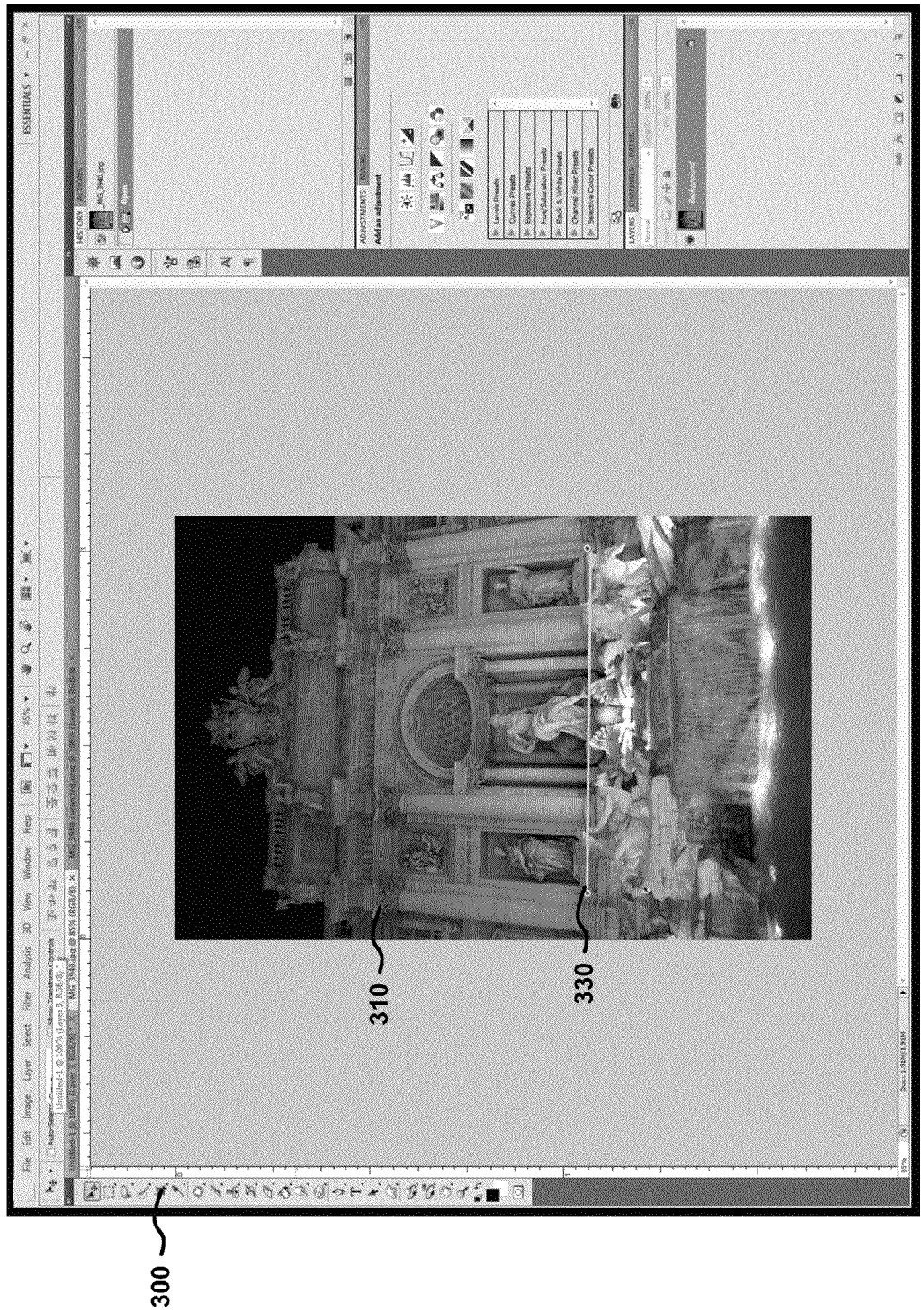
Figure 3D:
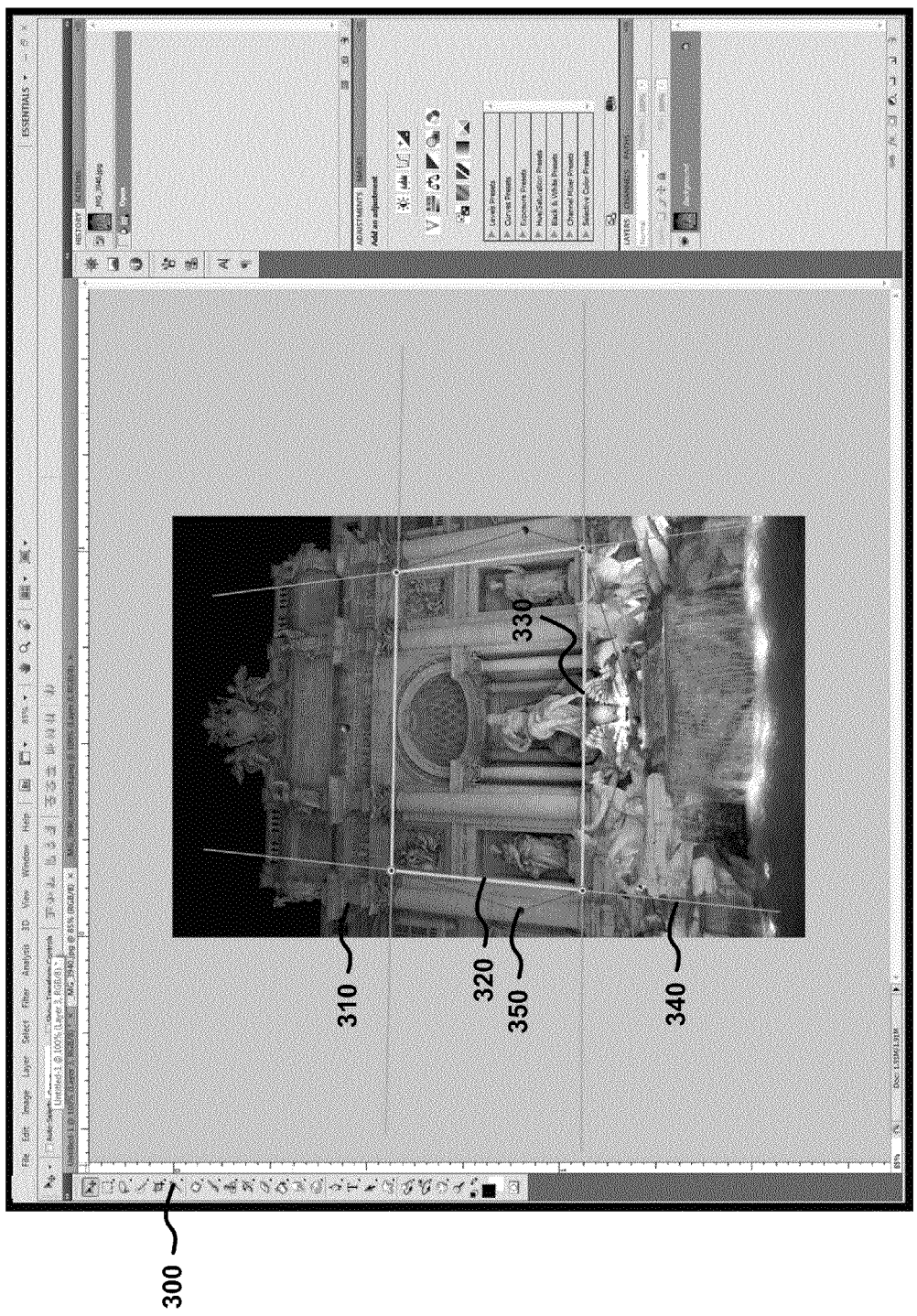
FIGS. 3D and 3E illustrate exemplary perspective manipulation interfaces in accordance with various embodiments.

As an example, a common scenario involving perspective manipulation arises with an image that contains a single face (or quad) of interest that the user intends to correct or otherwise alter. FIG. 3A illustrates an exemplary digital media editing tool 300 in which a loaded image 310 is to be edited. The image 310 appears to have been photographed from a lower position resulting in the structural aspects of the image 310 being tilted or skewed inwards and upwards. FIG. 3B shows that the user has indicated a single quad 320 of the image 310 that is to undergo perspective manipulation. FIG. 3C additionally illustrates a particular line 330 indicative of a hint, in this case, a line that the user wishes to remain unaltered. FIG. 3D illustrates an example of how an image, i.e., image 310, may be marked up with the quad indication 320, the line 330 constraint, and vanishing point lines 340 in accordance with various embodiments.

Once the user draws or specifies the quad, a visual indicator such as a button is displayed to the user, whereupon actuation of the button turns the quad into a rectangle, thereby inducing a pleasing perspective distortion. Alternatively, once the quad is specified, the user may utilize intuitive actions, such as clicking (if using, e.g., a mouse) on any point within the specified quad, and dragging the point within the quad to effectuate perspective manipulation. Alternatively still, a manipulating interface may be provided to the user, such as one or more knobs, or other points of control that emanate from the specified quad. The movement or actuation of the one or more knobs or points of control by the user effectuates perspective manipulation. That is, a direct relationship exists between a user's input/movement/action and manipulation of perspective in accordance with various embodiments.

Figure 3E:
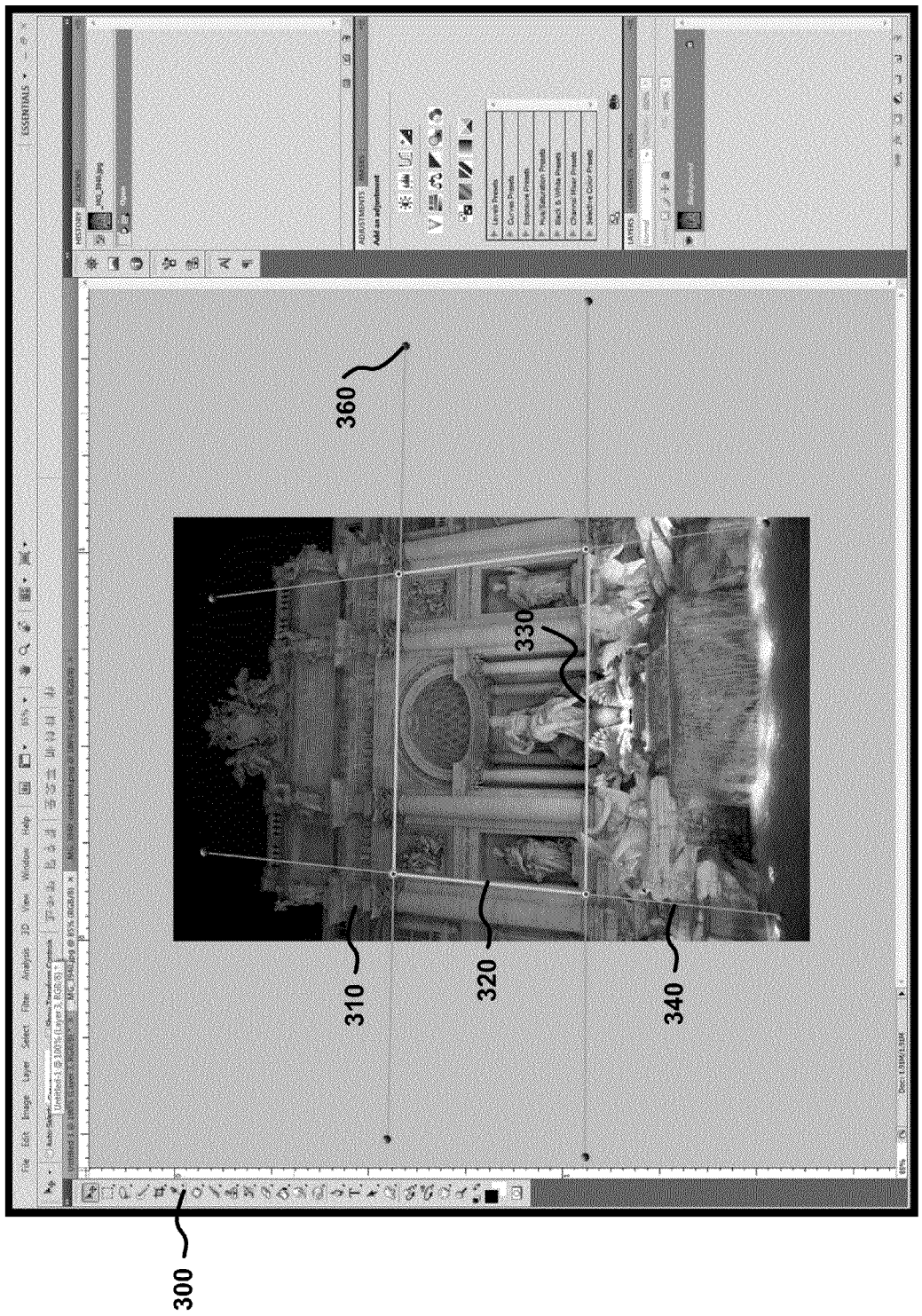
Figure 3F:
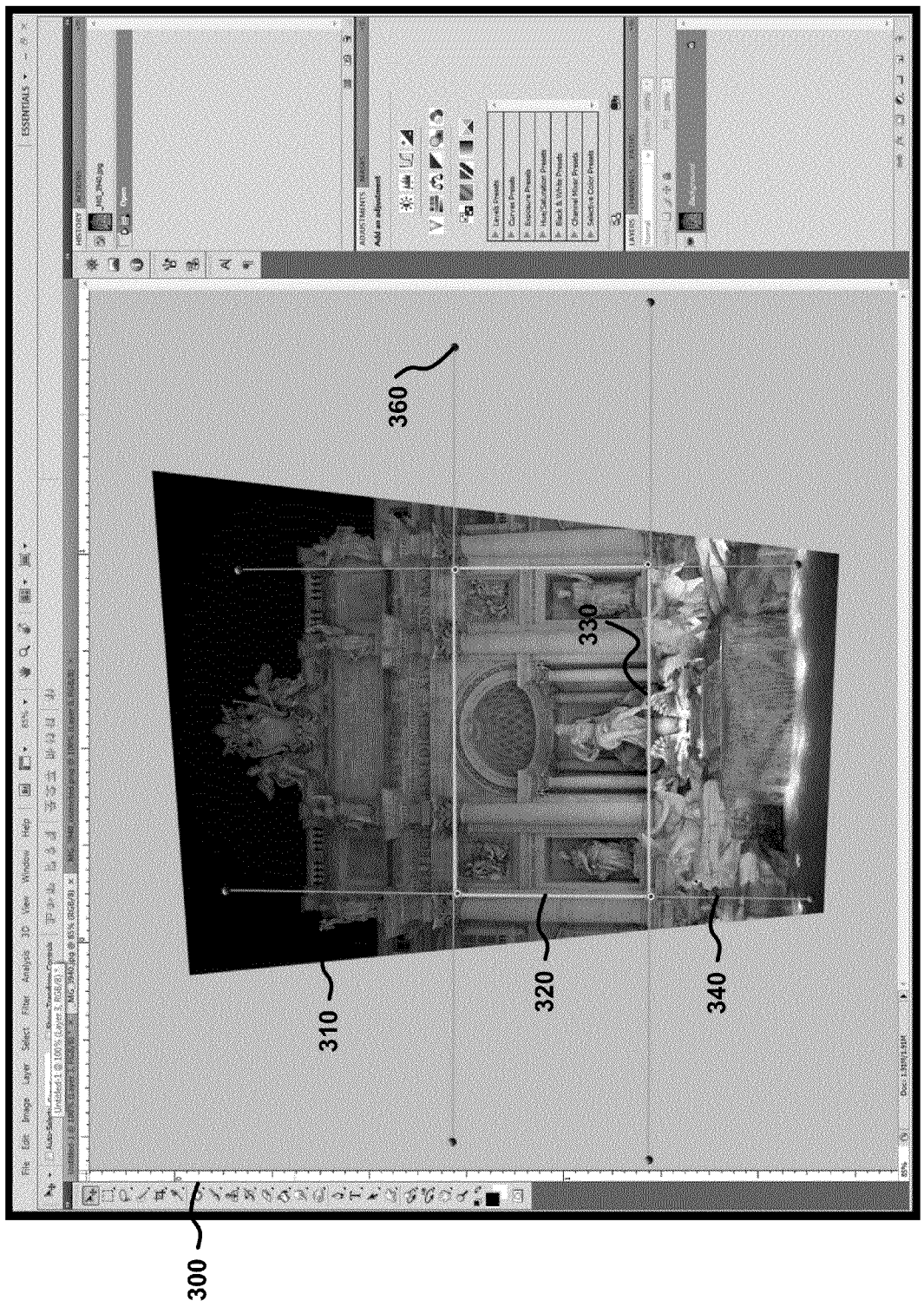
FIG. 3F illustrates an exemplary post-perspective-manipulation image.

FIG. 3D illustrates a perspective manipulation interface that presents visual indicators such as buttons 350. FIG. 3E shows additional buttons 360 associated with the vanishing point lines that may be adjusted/altered by the user as well to effectuate perspective manipulation. FIG. 3F illustrates the image 310, post-manipulation, where it is seen that the perspective of the image has been adjusted such that the face of the image 310 appears to have been photographed from a "head-on" perspective.

Figure 4A:
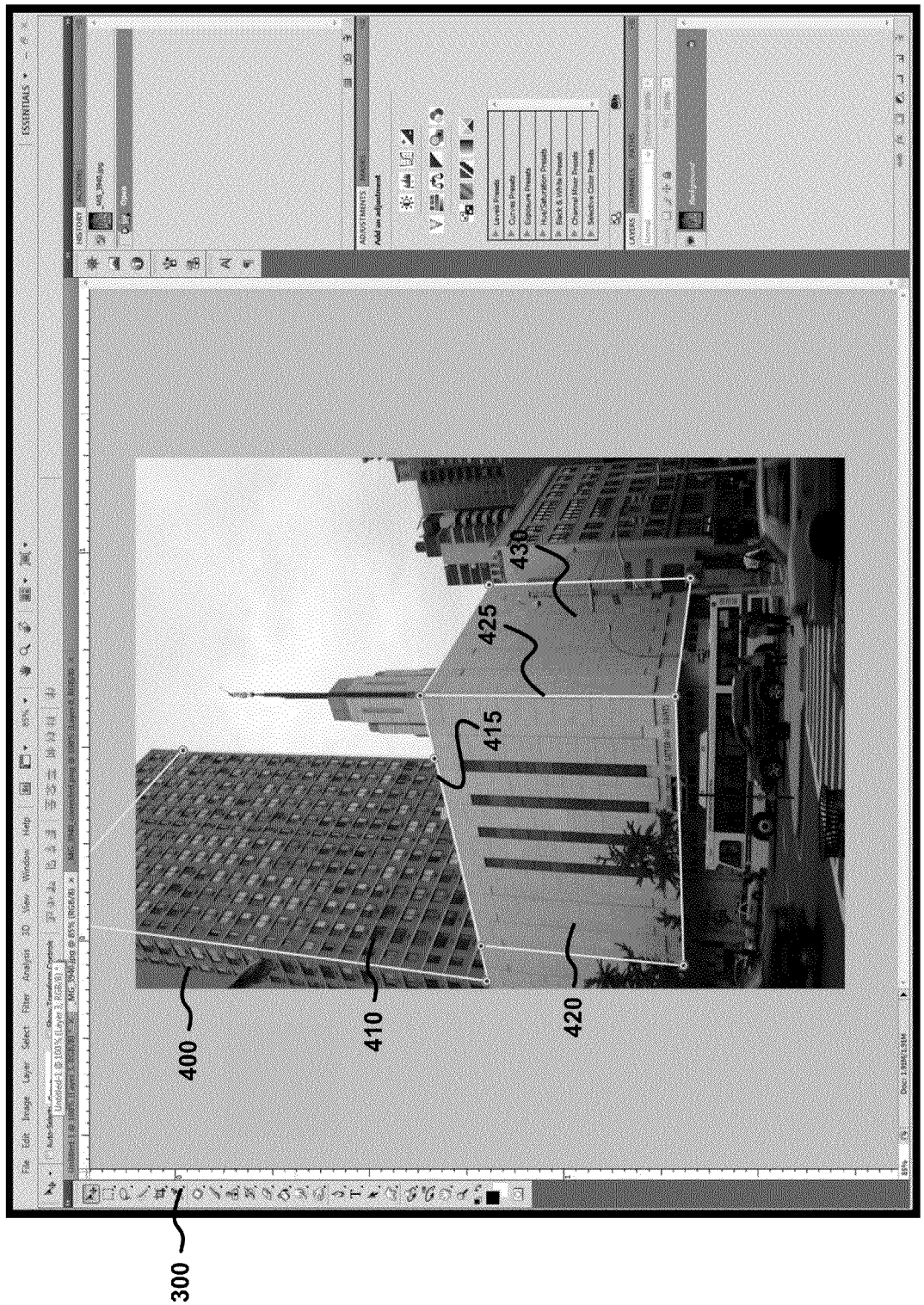
FIGS. 4A and 4B illustrate an exemplary perspective manipulation scenario where multiple quads are specified.
Figure 4B:
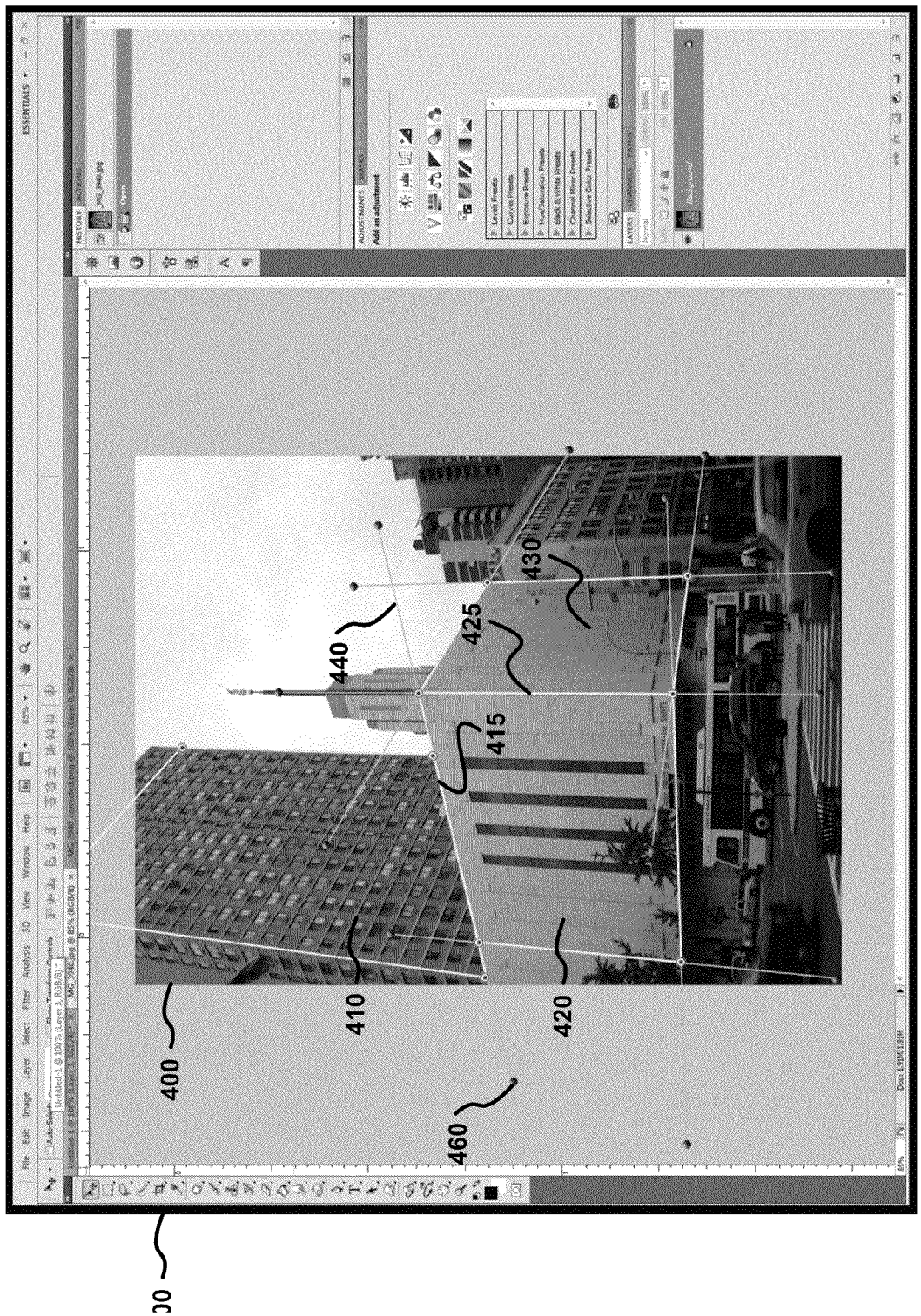

FIG. 4A illustrates the photo editing tool 300 in which an image 400 has been loaded and is to be manipulated. In this instance, a user has indicated three different quads of interest in the image 400, i.e., quads 410, 420, and 430. It should be noted that as was indicated previously, quads may share one or more edges. FIG. 4A illustrates an example of this where quads 410 and 420 share an edge 415, and quads 420 and 430 share another edge 425. FIG. 4B illustrates the vanishing point lines 440 associated with the edges of the quads 410, 420 and 430, as well as a manipulation interface in the form of buttons/points 460 which may be actuated/moved by the user to control perspective.

The points, lines, areas, etc. that are selected, drawn, and/or indicated by the user are displayed in a variety of ways to the user. For example, a quad may be delineated by yellow lines connecting the points that define the quad. Points that are to remain fixed within the quad may be represented by red dots. A line segment that a user selects or draws may be shown to the user with a green line, but after being associated with some constraint may be shown to the user as a red line. Alternatively, hash lines or other distinguishing indicators may be utilized to suggest different elements or element status. One or more virtual rules/grid lines may be displayed to the user to assist, if needed, in manipulating perspective to "true vertical" or "true horizontal" perspectives. It should be noted that these examples of implementing the user interface are not intended to be limiting, and that other intuitive graphical representations may be presented to the user when utilizing the tool.

Additionally, various key-strokes/input movements or combinations thereof may be used to effectuate certain perspective manipulation actions, such as the aforementioned snap to vertical or horizontal. That is, a user may hint a particular line in an image while simultaneously pressing and holding a shift key.

For the case of a single quad of interest, and in a mathematical context, a global perspective transformation is applied to the entire image. In a scenario where multiple quads are to be manipulated, an "as-rigid-as-possible" deformation is utilized to effectuate perspective transformation on the remainder of the image. That is, a user may wish to deform or manipulate the perspective of multiple quads. However, in order for the entire image that encompasses the quad to remain intact, regions outside the quads of interest are manipulated using the as-rigid-as-possible deformation, such as that provided by Adobe® Puppet Warp, to obtain a solution that has a natural appearance. It should be noted that the term "natural" in this context does not necessarily suggest that any image, post-manipulation, mirrors or suggests a geometrically-correct image, but rather that the algorithm compensates for certain manipulations to prevent the possibility of holes appearing in the regions outside the quads.

That is, every pixel in an image that is to be manipulated is covered by a mesh overlay. The mesh contains any of the user-defined quads as well as any region(s) outside the quads. First, and when the user manipulates the quads, the quads are manipulated in accordance with the user's input, while new texture coordinates are computed according to the new homography as dictated by the user's input/interaction. Second, any part of the mesh that encompasses a region(s) outside of any quads are deformed using the as-rigid-as-possible deformation. As-rigid-as-possible deformation refers to a type of deformation that may be applied such that while the mesh changes shape to accommodate perspective manipulation in one area, the overall mesh is kept as rigid as possible so that, e.g., movement/deformation in one area results in more natural movement/deformation in other areas. In the context of perspective manipulation as disclosed herein, and because the tool is aware of what every single pixel is doing/undergoing at any given time, the as-rigid-as-possible deformation is utilized to ensure that those regions outside of the quads of interest deform in a way that potential holes in the image are avoided.

Figure 5:
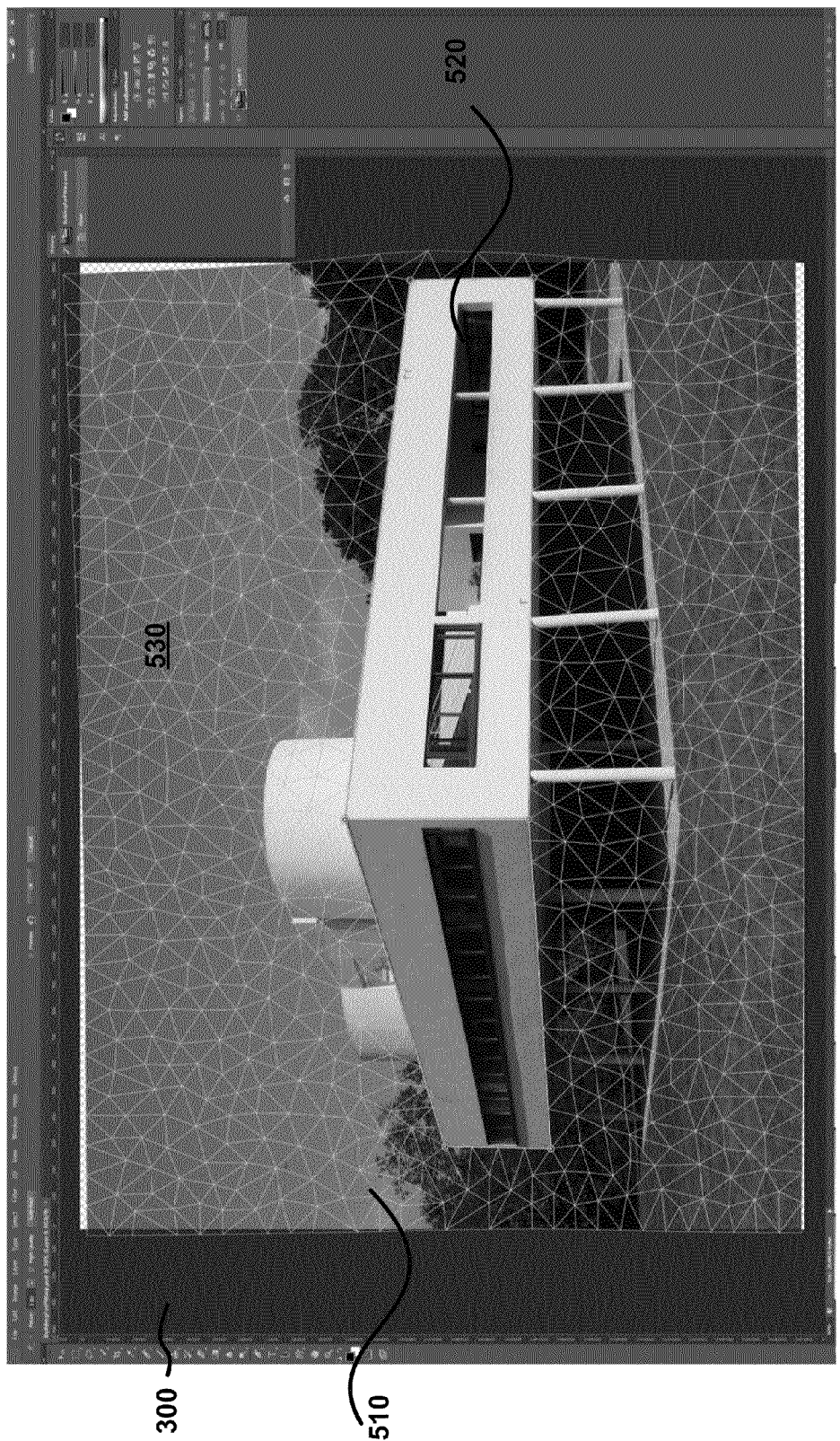
FIG. 5 illustrates an example of as-rigid-as-possible deformation compensation in accordance with various embodiments.

FIG. 5 illustrates an example of this as-rigid-as-possible deformation. FIG. 5 illustrates an exemplary photo editing tool 300 in which an image 510 of a building and a surrounding area has been loaded. A user may define one or more quads, engage in marking up the image 510 with hints, etc. as described previously. FIG. 5 further illustrates the aforementioned mesh overlay 530 that is utilized to ensure that no holes result after perspective manipulation in the regions outside of the one or more quads specified by the user (in this instance, the two faces of the building).

The manipulation of perspective or deformation effectuated in accordance with various embodiments is designed to be interactive and fluid. Because the user is able to directly manipulate perspective in an image, and see the result as the manipulation occurs, the user is allowed to learn the behavior of the algorithm intuitively. Moreover, and because perspective transformation is an inverse operation, the mathematical constraints can become unstable, and without a preview, the user is unaware if he/she is providing a bad or otherwise improper constraint. Thus, various embodiments also operate to avoid some or even many mathematical errors. The user interface may provide the live preview by, in one embodiment, effectuating the manipulation as directed by the user. Alternatively, the original or last version of the image may be maintained as a background, and the live preview may be overlaid allowing the user to see before and after results together.

Returning to the markup phase, many types of interactions are contemplated in accordance with various embodiments. In many instances, quad constraints are not enough to produce a desired look/image to a user. Thus, and as described above, higher level constraints may be specified by the user, such as specifying that a given line should remain straight, that a given point should remain unchanged in location, and/or that a given edge of a quad should be vertical or horizontal. Other higher level constraints may include, but are not limited to the following: specifying that two quads have multiple shared edges; specifying that two quads have line-segments that move in tandem; specifying that all quads or a set of quads obey one single vanishing point; and being able to manipulate a vanishing point, not merely the corner(s) or edge(s) of one or more quads. In the example of the vanishing point constraint, such a feature provides a more natural approach for traditional artists or painters.

Still another example of a higher level constraint involves situations when a given region may be considered to be a part or an extension of a plane defined by a user-specified quad. This is important, for example, if there is a tree in front of a building face, and the user doesn't want as-rigid-as-possible deformation being used on the tree. That is, the user wishes to have the tree move in the same way as the building face. In this instance, a brushing model may be used to specify this extension or "part of" region.

Furthermore, the tool in accordance with various embodiments may be configured to provide certain types of assistance to a user. For example, in situations where there is too much distortion, technology such as the Adobe® Content-Aware-Fill feature may be utilized to fill regions resulting in more natural looking images. That is, subsequent to or during perspective manipulation, the tool or software application may analyze the contents of the image to determine what the image would appear as with less distortion, thus providing the ability to "correct" the perspective manipulation of a user if the user desires to comply with the correction.

Another example of a help or corrective feature involves the use of pins as in as-rigid-as-possible deformation to control the manipulation of regions outside of specified quads, providing more precision to the overall perspective warp. Further still, and in accordance with the aforementioned snap-to and grid features, computer vision techniques may also be relied upon to determine lines and quads within an image that may be used in order to either guide the markup process or automate the discovery of quads.

It should be noted that with regard to the variety of features, automatic and manual, as well as the corrective features discussed herein, default settings or configurations may be applied to the tool, again, to provide an easy, efficient, and intuitive experience for perspective manipulation. For example, a user may most often wish to manipulate perspective to a straight ahead perspective, and so may configure the relevant constraints to automatically produce such a result. Another example may be that a user wishes to have a setting that can be used to apply a certain amount/percentage of correction to a warp.

Perspective manipulation in accordance with various embodiments is designed to result in a playful, interactive, and creative experience. While the tool allows the altering of perspective of an image in its entirety, the tool also allows for the easy manipulation of perspective of multiple objects (building faces, facades, walls, windows, architectural planes, and/or lines) easily and independently of each other. This not only allows for full creative freedom on the user's part, but also saves, e.g., a photographer, time and money in capturing that perfect shot. For example, a photographer without access to the tool disclosed herein might have to wait to get into a position to take a photograph that reflects a desired perspective. However, the same photographer is now able to shoot from a non-ideal position, and simply warp the image in any manner desired via perspective manipulation as disclosed herein.

It should be noted that various embodiments disclosed herein may be utilized for a variety of media applications beyond adjusting or controlling perspective in a photograph. That is, the systems and methods described herein may be applied to adjusting and/or controlling perspective in digitized artwork, a video file, etc. For example, the systems and methods described herein may be utilized by an artist to adjust the perspective of a drawing, thus providing the artist with a convenient tool to make corrections after the drawing has already been created. Alternatively, and because, as described above, the systems and methods disclosed herein allow a user to warp perspective even in "unnatural" or non-occurring ways, an artist may utilize the tool to easily add warping effects to an image.

In the case of, e.g., a video file, a user may select of quad of interest within the video, and manipulate perspective similarly to that as previously described with respect to still images. However, the selected quad is tracked as it moves in one or more scenes so that, for example, the applied perspective may be maintained through the one or more scenes of the video, while the perspective need only be manipulated one time by the user. A robust point tracking algorithm may be utilized to track the quad. Hence, and for example, the user may manipulate the perspective of a building captured on video, and that altered perspective will remain throughout one or more scenes/sequences that the building appears in the video.

While various embodiments of the present invention have been described above for a digital photographic editing application/feature implemented on a computer, it should be understood that they have been presented by way of example only, and not of limitation. For example, the application may be hosted on a server, and executed as a network-based application. Furthermore, the devices upon which the application/feature may be implemented can vary from standalone workstations to portable tablet devices, personal digital assistants, and the actual application/feature may encompass more or less functionality depending on the device on which it is implemented.

Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" or "exemplary" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Moreover, various embodiments described herein are described in the general context of method steps or processes, which may be implemented in one embodiment by a computer program product, embodied in, e.g., a non-transitory computer-readable memory, including computer-executable instructions, such as program code, executed by computers in networked environments. A computer-readable memory may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes. Various embodiments may comprise a computer-readable medium including computer executable instructions which, when executed by a processor, cause an apparatus to perform the methods and processes described herein.

As used herein, the term module can describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality. Where components or modules of the invention are implemented in whole or in part using software, in one embodiment, these software elements can be implemented to operate with a computing or processing module capable of carrying out the functionality described with respect thereto.

What is claimed is:
1. A method, comprising:
receiving an indication of a portion of digital media to undergo perspective manipulation;

providing a user interface arising from the indicated portion of the digital media through which the perspective manipulation is to be performed;

identifying a sub-portion of the digital media that is within the indicated portion of the digital media and that is to remain unchanged by the perspective manipulation, wherein the sub-portion of the digital media is identified based on information received via the user interface regarding at least one constraint associated with the indicated portion of the digital media;

updating the user interface to include a visual indicator identifying the sub-portion of the digital media that is to remain unchanged by the perspective manipulation;

performing the perspective manipulation of the indicated portion of the digital media in accordance with user input and the received information regarding the constraint; and displaying a real-time preview of the perspective manipulation such that the identified sub-portion of the digital media is not changed in the real-time preview.

2. The method of claim 1, wherein the receipt of the indication of the portion of the digital media comprises receiving information regarding at least four points delineating at least one quadrilateral area of the digital media.

3. The method of claim 1, wherein the information regarding the at least one constraint associated with the indicated portion of the digital media comprises constraint information identifying the sub-portion of the digital media as at least one of a point within the indicated portion of the digital media, a line within the indicated portion of the digital media, and a quadrilateral area encompassing the indicated portion of the digital media.

4. The method of claim 1, wherein the digital media comprises at least one of a digital image or digital video.

5. The method of claim 1, wherein the user input comprises direct interaction with the indicated portion of the digital media.

6. The method of claim 1, wherein the user input comprises an instruction to perform automatic perspective manipulation in accordance with a default perspective setting.

7. The method of claim 1 further comprising, performing perspective transformation on a remainder of the digital media utilizing an as-rigid-as-possible deformation scheme.

8. The method of claim 1 further comprising, receiving an additional indication of an additional portion of the digital media to be considered an extension of the indicated portion of the digital media.

9. The method of claim 8 further comprising, performing the same perspective manipulation on the additional portion of the digital media as that performed on the indicated portion of the digital media.

10. The method of claim 1 further comprising, automatically detecting at least one aspect of the digital media to assist in the receiving of the indication of the indicated portion of the digital media to undergo the perspective manipulation.

11. The method of claim 1, wherein the identified sub-portion comprises a linear region within the indicated portion of the digital media that is to remain unaltered when the perspective manipulation is applied to the remainder of a polygonal object that is within the indicated portion of the digital media and that includes the linear region.

12. The method of claim 1, wherein the identified sub-portion comprises an edge of a quadrilateral region within the indicated portion of the digital media that is to remain unaltered when the perspective manipulation is applied to at least a portion of the quadrilateral region.

13. The method of claim 1, wherein the identified sub-portion comprises a point within the indicated portion of the digital media that is to remain stationary when the perspective manipulation is applied to content surrounding the point such that at least some of the content is changed by the perspective manipulation.

14. The method of claim 1, wherein the visual indicator identifying the sub-portion of the digital media that is to remain unchanged by the perspective manipulation has a color or shape different from an additional visual indicator identifying another sub-portion of the digital media that is changeable by the perspective manipulation.

15. A computer program product, embodied on a non-transitory computer-readable medium, comprising:

computer code for receiving an indication of a portion of digital media to undergo perspective manipulation;

computer code for providing a user interface arising from the indicated portion of the digital media through which the perspective manipulation is to be performed;

computer code for identifying a sub-portion of the digital media that is within the indicated portion of the digital media and that is to remain unchanged by the perspective manipulation, wherein the sub-portion of the digital media is identified based on information received via the user interface regarding at least one constraint associated with the indicated portion of the digital media;

computer code for updating the user interface to include a visual indicator identifying the sub-portion of the digital media that is to remain unchanged by the perspective manipulation;

computer code for performing the perspective manipulation of the indicated portion of the digital media in accordance with user input and the received information regarding the constraint; and computer code for displaying a real-time preview of the perspective manipulation such that the identified sub-portion of the digital media is not changed in the real-time preview.

16. The computer program product of claim 15, wherein the received indication of the portion of the digital media comprises at least four points delineating at least one quadrilateral area of the digital media.

17. The computer program product of claim 15, wherein the information regarding the at least one constraint associated with the indicated portion of the digital media comprises constraint information identifying the sub-portion of the digital media as at least one of a point within the indicated portion of the digital media, a line within the indicated portion of the digital media, and a quadrilateral area encompassing the indicated portion of the digital media.

18. The computer program product of claim 15 further comprising, computer code for automatically detecting at least one aspect of the digital media to assist in the receiving of the indication of the portion of the digital media to undergo the perspective manipulation.

19. A computer program product, embodied on a non-transitory computer-readable medium, comprising:

computer code for receiving information regarding at least one user-defined quadrilateral section of digital media to undergo perspective manipulation;

computer code for identifying a sub-portion of the digital media that is within the at least one user-defined quadrilateral section and that is to remain unchanged by the perspective manipulation, wherein the sub-portion of the digital media is identified based on constraint information received via a user interface;

computer code for translating direct user interaction with the at least one user-defined quadrilateral section into the perspective manipulation via the user interface arising from the at least one user-defined quadrilateral section of the digital media without altering the identified sub-portion of the digital media; and computer code for displaying a real-time preview of the perspective manipulation such that the identified sub-portion of the digital media is not changed in the real-time preview.

20. The computer program product of claim 19, wherein the identified sub-portion of the digital media comprises at least one of a point within the at least one user-defined quadrilateral section or a linear section within the at least one user-defined quadrilateral section.

21. The computer program product of claim 19 further comprising, computer code for automatically detecting at least one aspect of the digital media to assist in the receiving of the information regarding the at least one user-defined quadrilateral section of the digital media to undergo perspective manipulation.

22. A system, comprising:
a non-transitory computer-readable medium;
a processor operatively connected to the non-transitory computer-readable medium and configured to execute computer code stored in the non-transitory computer-readable medium for performing operations comprising:
receiving information regarding at least one user-defined quadrilateral section of digital media to undergo perspective manipulation,
identifying a sub-portion of the digital media that is within the at least one user-defined quadrilateral section and that is to remain unchanged by the perspective manipulation, wherein the sub-portion of the digital media is identified based on constraint information received via a user interface arising from the at least one user-defined quadrilateral section of the digital media,
translating direct user interaction with the at least one user-defined quadrilateral section into the perspective manipulation via the user interface, and
providing a real-time preview of the perspective manipulation for display by a display device such that the identified sub-portion of the digital media is not changed in the real-time preview.

23. The system of claim 22, wherein the operations further comprise automatically detecting at least one aspect of the digital media associated with the at least one user-defined quadrilateral section.

* * * * *